Figure 8:
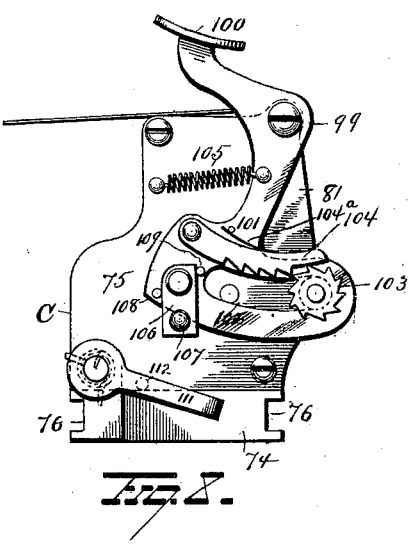

No. 625,617. Patented May 23, 1899.
R. W. UHLIG.
TYPE WRITING MACHINE.
(Application filed Feb. 19, 1897.)
(No Model.) 9 Sheets—Sheet 1.
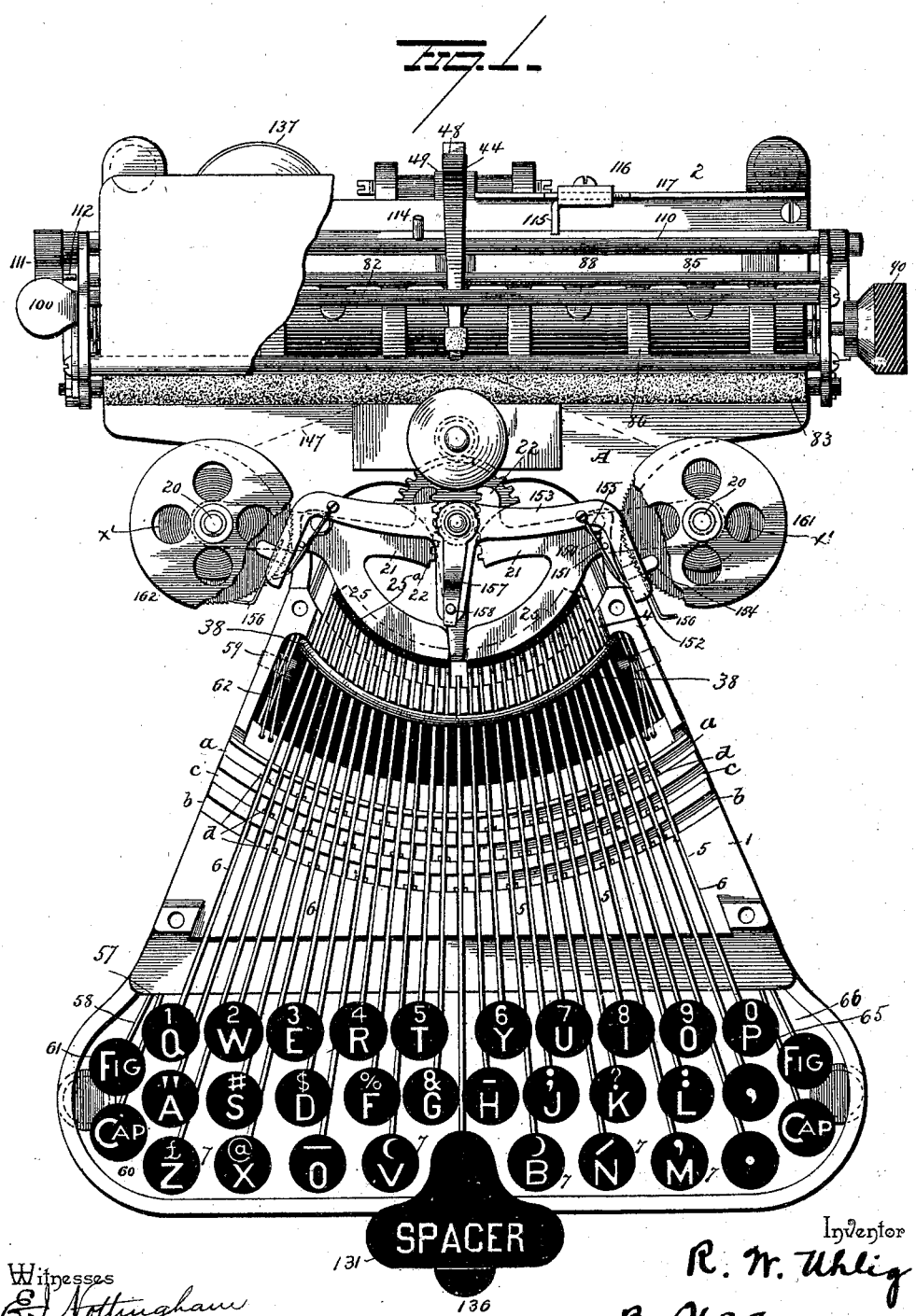

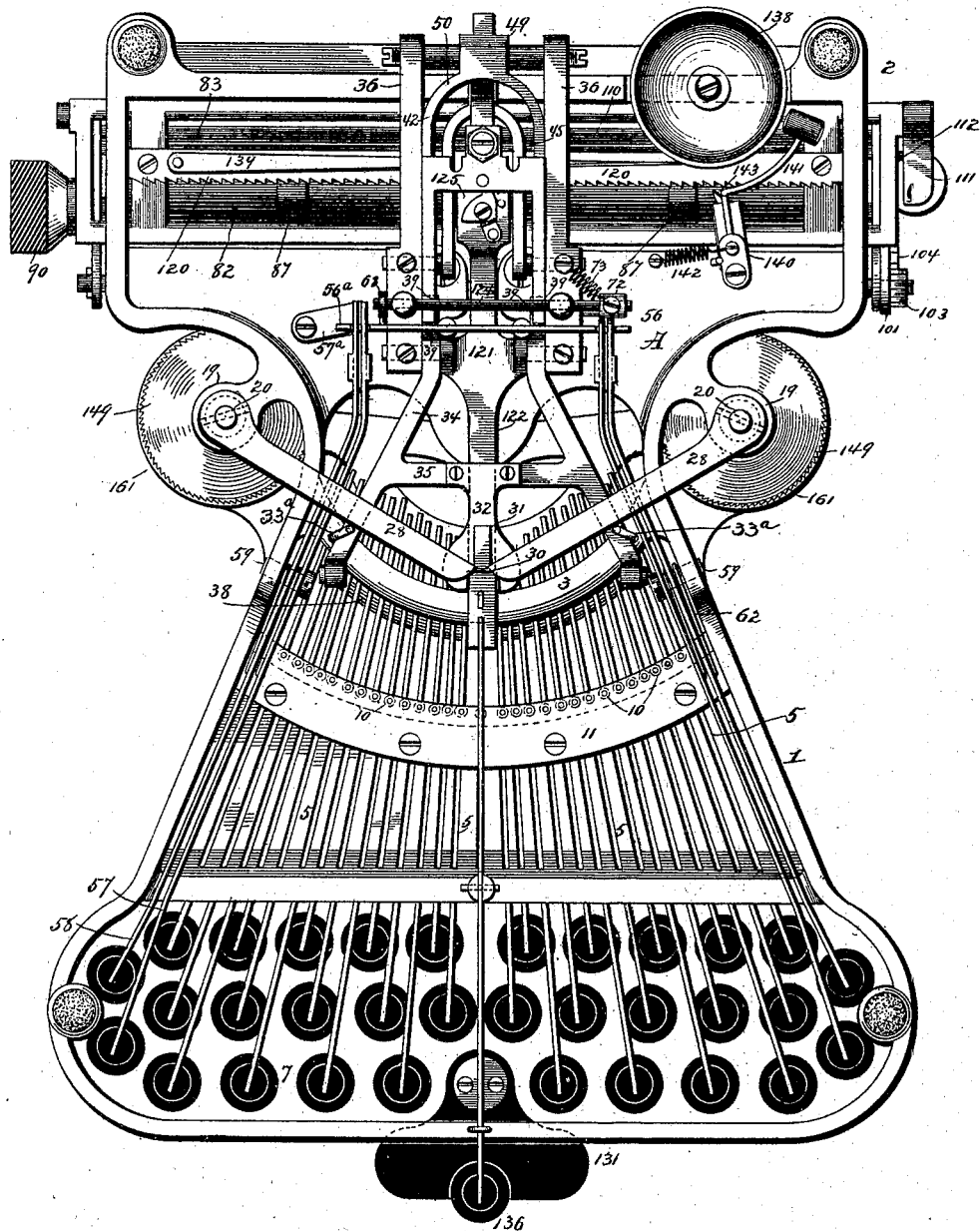

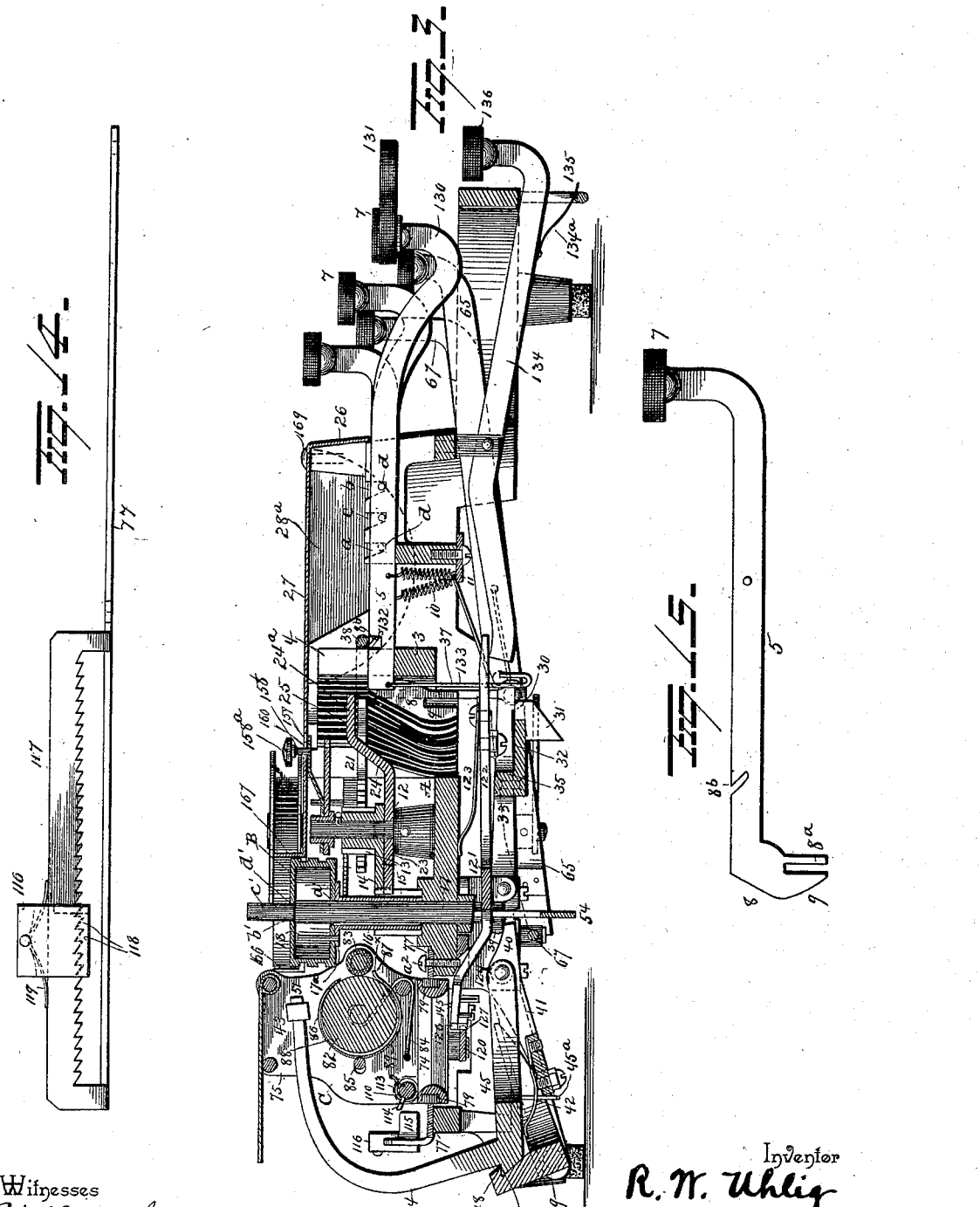

No. 625,617. Patented May 23, 1899.
R. W. UHLIG.
TYPE WRITING MACHINE.
(Application filed Feb. 19, 1897.)
(No Model.) 9 Sheets—Sheet 4.
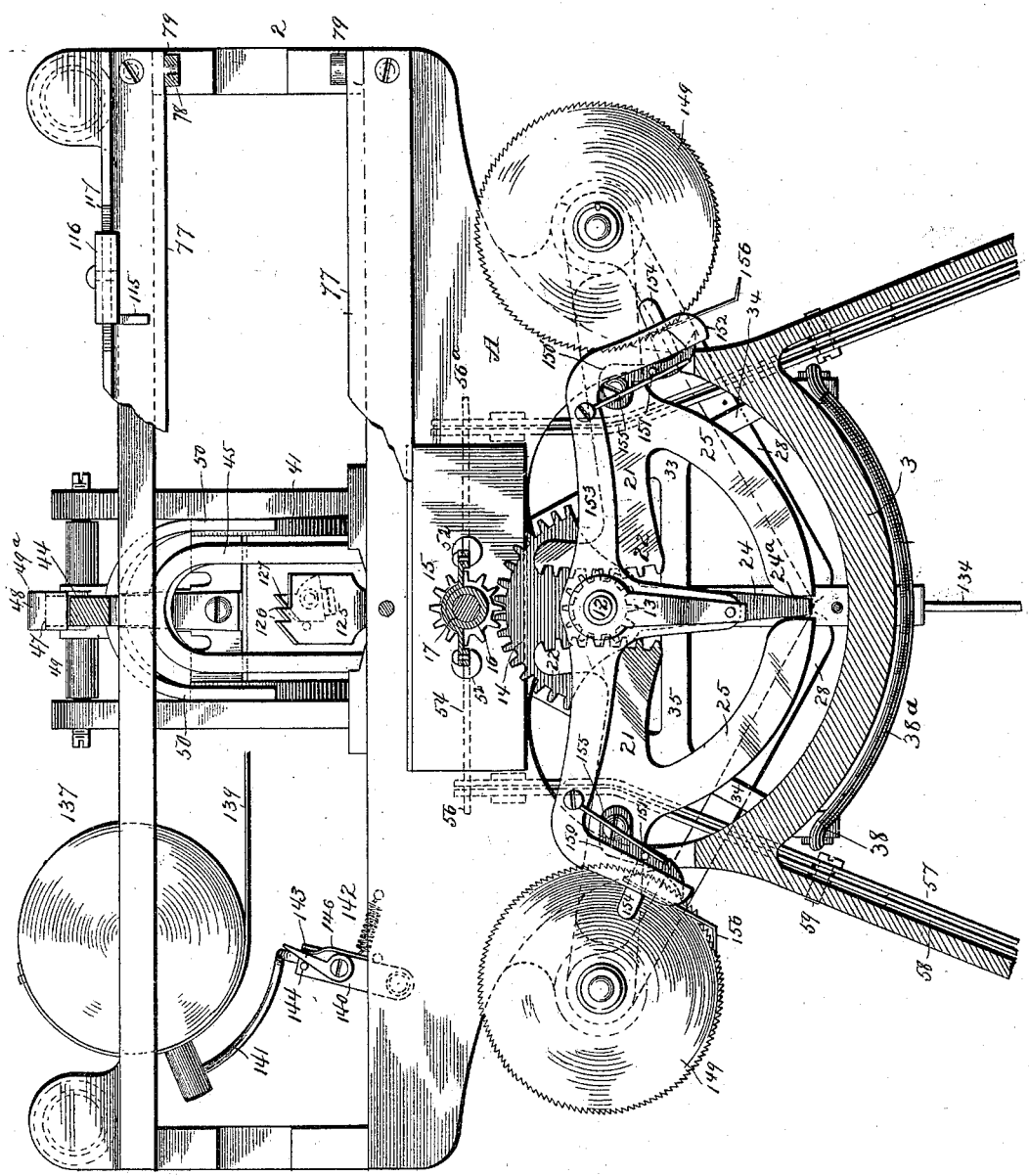
Witnesses
E. J. Nottingham
G. F. Downing
Inventor
R. W. Uhlig
By H. A. Seymour
Attorney

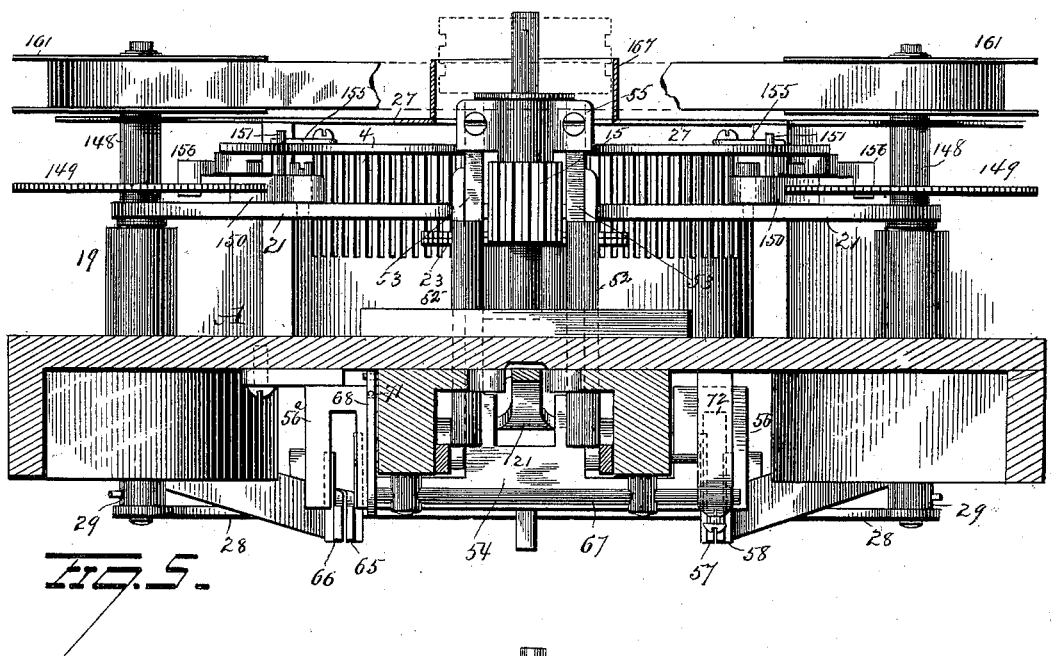

No. 625,617. Patented May 23, 1899.
R. W. UHLIG.
TYPE WRITING MACHINE.
(Application filed Feb. 19, 1897.)
(No Model.) 9 Sheets—Sheet 6.

Witnesses
E. J. Nottingham
G. F. Downing

Inventor
R. W. Uhlig
By H. A. Seymour
Attorney

No. 625,617. Patented May 23, 1899.
R. W. UHLIG.
TYPE WRITING MACHINE.
(Application filed Feb. 19, 1897.)
(No Model.) 9 Sheets—Sheet 7.
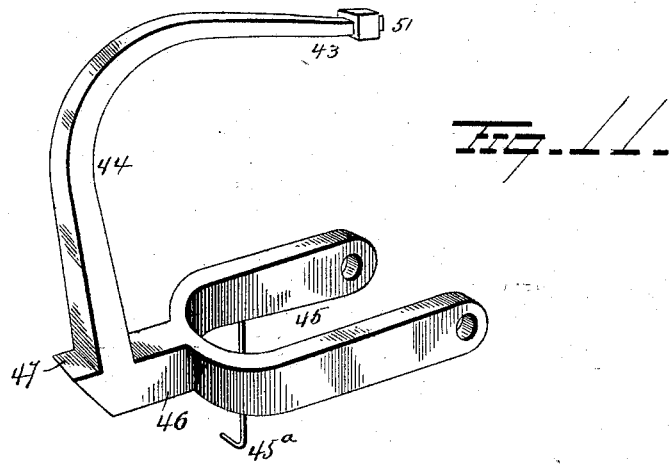
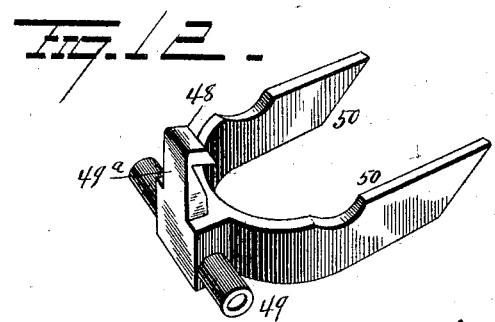
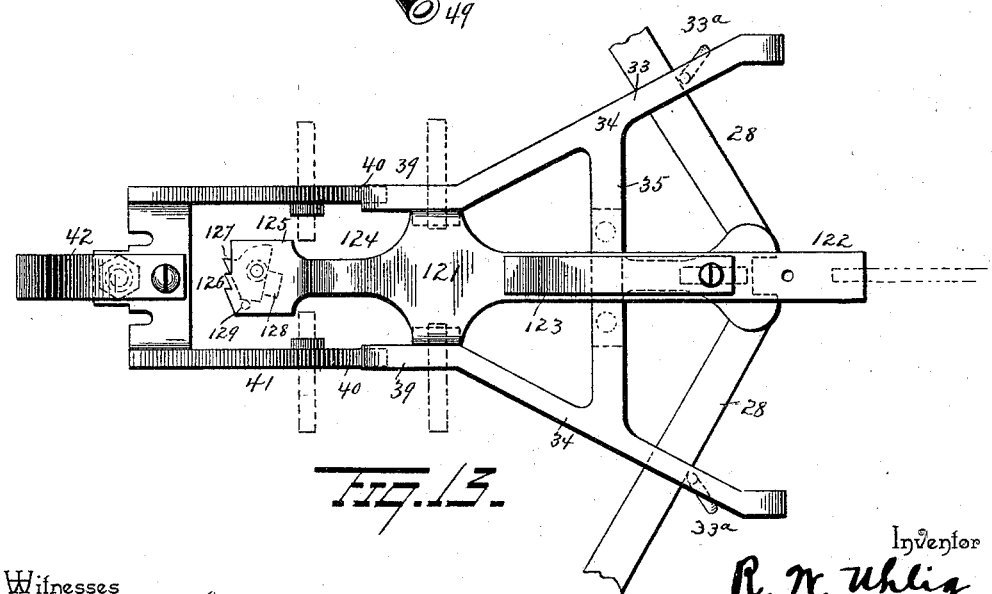
Witnesses
E. J. Nottingham
G. F. Downing.
Inventor
R. W. Uhlig
By H. A. Seymour
Attorney No. 625,617. Patented May 23, 1899.
R. W. UHLIG.
TYPE WRITING MACHINE.
(Application filed Feb. 19, 1897.)
(No Model.) 9 Sheets—Sheet 8.

Witnesses
E. J. Nottingham
G. F. Downing

Inventor
R. W. Uhlig
By H. A. Seymour
Attorney

THE NORRIS PETERS CO., PHOTO-LITHO., WASHINGTON, D. C.

No. 625,617. Patented May 23, 1899.
R. W. UHLIG.
TYPE WRITING MACHINE.
(Application filed Feb. 19, 1897.)
(No Model.) 9 Sheets—Sheet 9.
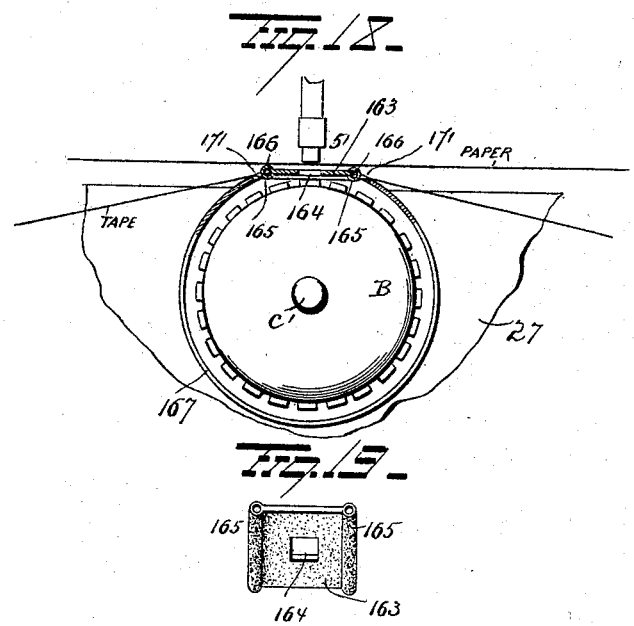
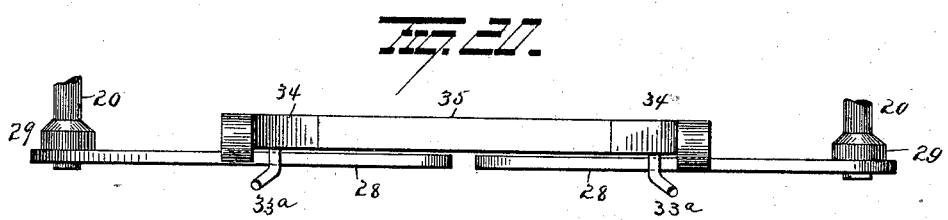
Witnesses
E. J. Nottingham
G. F. Downing
Inventor
R. W. Uhlig
By H. A. Seymour
Attorney

United States Patent Office.

RICHARD W. UHLIG, OF NEW YORK, N. Y., ASSIGNOR TO WILLIAM B. BALDWIN, OF SAME PLACE.

TYPE-WRITING MACHINE.

SPECIFICATION forming part of Letters Patent No. 625,617, dated May 23, 1899.

Application filed February 19, 1897. Serial No. 624,171. (No model.)

*To all whom it may concern:*

Be it known that I, RICHARD W. UHLIG, a resident of New York, (College Point,) in the county of Queens and State of New York, have invented certain new and useful Improvements in Type-Writing Machines; and I do hereby declare the following to be a full, clear, and exact description of the invention, such as will enable others skilled in the art to which it appertains to make and use the same.

My invention relates to an improvement in type-writing machines, one object of the invention being to improve in various respects the machine disclosed by Letters Patent granted to me November 16, 1897, No. 593,789, whereby to reduce the cost of construction, render the machine more compact and simple, and enhance the general efficiency of the machine.

A further object is to improve the construction and arrangement of parts between the key-levers and the type-wheel.

A further object is to provide improved devices for actuating the carriage-feed mechanism.

A further object is to provide the machine with simple and efficient hammer actuating and controlling mechanism.

A further object is to improve and simplify the carriage and paper feed mechanisms.

A further object is to so construct the paper holding or carrying and feeding mechanism that the paper will be normally held closely coiled and be properly and accurately fed and guided with the use of only two rollers, one adapted to receive the paper to be written upon and both of said rollers serving to guide and feed the paper.

A further object is to provide simple and accurately operating ribbon-feed mechanism.

A further object is to construct simple and efficient shifting devices for the ribbon-feed.

A further object is to so construct the ribbon-feed mechanism that it will be operated only when a type-key is depressed and not when the space-keys are operated, thus resulting in uniform wear on the inking-ribbon.

A further object is to provide devices whereby the type-wheel can be shifted for figures or capital letters, so as to cause said type-wheel to promptly return to its normal position for small letters or to remain set for capitals or figures, as desired.

A further object is to provide simple and efficient means whereby to cause the type-wheel to be shifted to position for capitals or figures and remain so set and to provide a simple means for releasing said type-wheel, so as to permit it to assume its normal position for small letters.

A further object is to so construct and arrange the machine that wear of the trunnions of the key-levers can be readily compensated for and the alinement thus easily corrected.

A further object is to produce a type-writing machine of the type-wheel class which shall be comparatively simple in construction, which shall not be easy to get out of order, and which shall be effectual in all respects in the performance of its functions.

A further object is to provide a simple device whereby to prevent blurring of the paper when manifold or carbon copies are being made.

With these objects in view the invention consists in certain novel features of construction and combinations and arrangements of parts, as hereinafter set forth, and pointed out in the claims.

Figure 9:
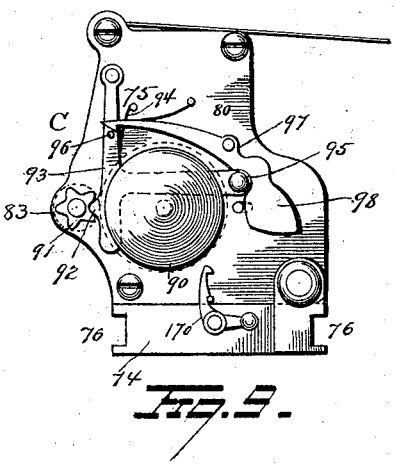
Figure 10:
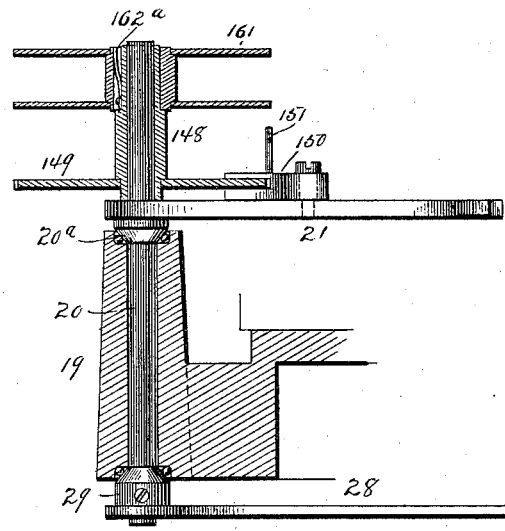
Figure 12:
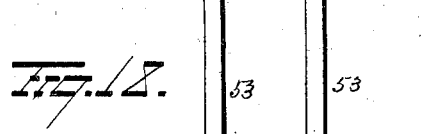
Figure 17:
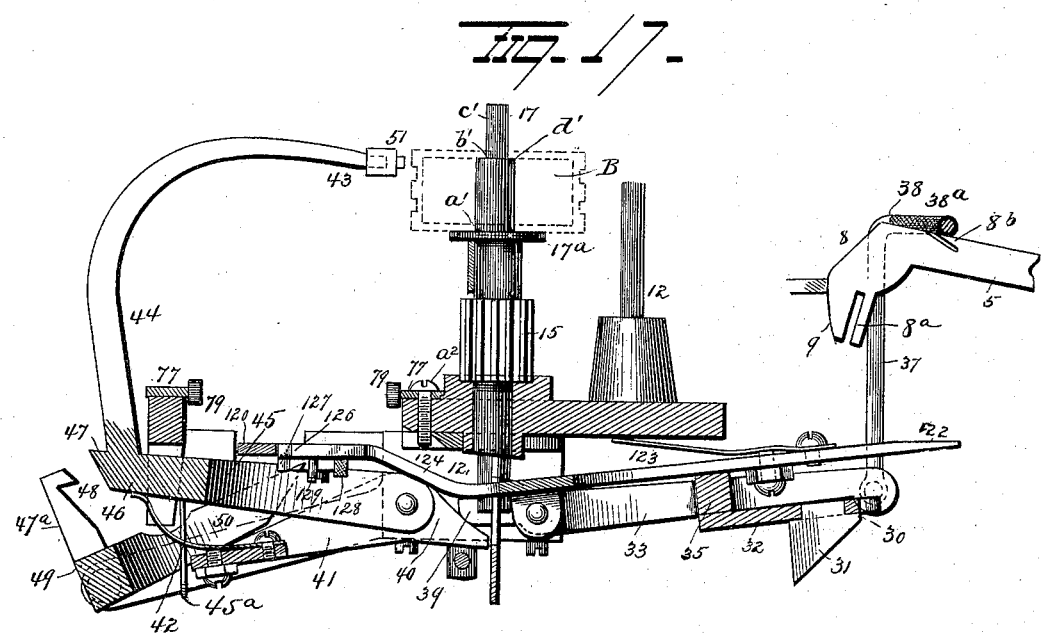
Figure 18:
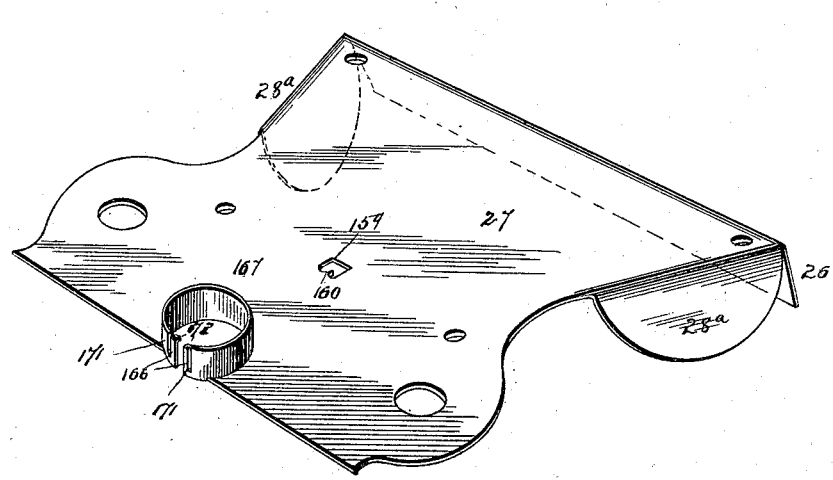

In the accompanying drawings, Figure 1 is a top plan view with the top plate removed. Fig. 2 is a bottom plan view. Fig. 3 is a sectional view. Fig. 4 is a plan view with parts removed. Fig. 5 is a cross-section. Figs. 6, 7, 8, 9, 10, 11, 12, 13, 14, 15, 16, 17, 18, 19, and 20 are detail views.

A represents a framework comprising in a single structure a tapering or approximately triangular front portion 1 for the accommodation of the key-levers and parts of the operating mechanism and an elongated rear portion 2 for the reception of the carriage. The inner end of the tapering portion 1 of the frame is made with a transverse web or bar 3, so curved as to mark about one-third of a circle concentric with the journal of the flier hereinafter described. The curved bar or web 3 projects above the upper face of the part 1 of the frame, so as to form a segmental flange 4, which is made with a number of notches for the reception and guidance of the key-levers 5. The key-levers 5 are also disposed in converging slots 6, made in the upper face of part 1 of the frame in line with the notches of flange 4. The upper face of part 1 of the frame is also made with three segmental grooves $a\ b\ c$, at least one wall of each of which is made inclined, whereby to form contracted bottoms to said grooves in which the pivot-pins or trunnions $d$ of the key-levers have their bearing. The key-levers are so arranged that the bank of keys will be rectangular in form, and said bank may be said to be divided into three sets or rows of keys with key-levers of varying lengths. The fulcrums or trunnions of the shortest key-levers are mounted in the groove $a$, the fulcrums or trunnions of the longest key-levers are arranged in the groove $b$, and the fulcrums or trunnions of the key-levers of intermediate length are disposed in the intermediate groove $c$. The key-levers are provided with the usual buttons or keys 7, and each key-lever is made with a cam or inclined end 8, and at the lower end of the cam or inclined end 8 each key-lever is beveled at an angle to said end 8, as shown at 9. Each key-lever is also made with a tongue $8^a$ and provided with a short tooth $8^b$ for purposes hereinafter explained. The key-levers are maintained in and returned to their normal positions by means of coiled springs 10, one end of which is attached to a key-lever forwardly of its fulcrum and the other end to a perforated plate 11, secured to the under face of the part 1 of the frame.

A post 12 is disposed on the intermediate portion of the frame concentric with the segmental flange 4, and on this post a pinion 13 is loosely mounted and has secured to it a toothed segment 14 to mesh with an elongated pinion 15, carried by a tubular shaft 16, which is loosely mounted on a post or spindle 17, projecting upwardly from the frame. The upper end of the post or spindle 17 is adapted for the reception of the type carrier or wheel B, having three sets of characters on its periphery arranged in rows one above the other, as is usual in this class of machines. The type-wheel is preferably made of hard rubber, is hollow, and without a hub. The lower end of the type-wheel is made with a hole $a'$, through which the spindle 17 passes, and the upper end of said wheel is made with a smaller hole $b'$, through which the contracted upper end $c'$ of the spindle passes, the upper head of the wheel normally resting on the shoulder $d'$ of the spindle. The type-wheel normally rests upon an annular flange $17^a$ on the tubular shaft and is prevented from turning independently of said shaft by means of a pin 18, projecting from said annular flange and entering a hole in the web of the type-wheel. In order to prevent possibility of accidental vertical displacement, the pin 18 is bent slightly, so that it will have frictional engagement with the wall of the hole in the type-wheel through which it passes. Instead of making the type-carrier B in the form of a wheel it may be made in the form of a segment, if desired.

Tubular uprights 19 are cast at each side of the intermediate portion of the frame and in line with the post 12, on which the pinion 13 and segment 14 are mounted. Through each of these tubular uprights a shaft 20 passes loosely, and each shaft 20 is provided with a cone $20^a$, which has its bearing on balls in the conical recess at the upper end of each post 19. Arms or levers 21 are rigidly secured to the respective shafts 20 and project inwardly toward each other, the free ends of said arms or levers being provided with rack-bars 22, disposed practically at right angles thereto and meshing with the pinion 13. Another toothed segment 23 of a size and form similar to the segment 14 is loosely mounted on the post 12 independently of said pinion 13 and segment 14 and adapted to mesh with the elongated pinion 15, so as to receive motion therefrom, said segment 23 being provided with a single arm 24, having its free end bent to form a finger $24^a$, said segment and its arm constituting what is known in machines of this class as a "flier" for shifting the type-wheel at the proper place when a key is depressed. The key-levers are divided into two groups—one group adapted to rotate the type-wheel in one direction and the other group adapted to effect the reverse rotation of said type-wheel—the extreme keys of each group being adapted to cause a half-revolution of the type-wheel in one direction or the other. In this machine the single arm of the flier is normally disposed in the center of the entire set of key-levers, or, in other words, between the two groups of key-levers, and therefore the extreme key-levers or those which move the type-wheel the farthest are located at the extreme outer ends of the two groups. To accomplish the results above noted—viz., the rotation of the type-wheel—I employ, in conjunction with the appliances hereinbefore described, two arms or levers 25, which may for convenience be termed "type-carrier-operating levers," and they are made integral with the respective arms or levers 21. The levers 25 project toward each other, marking, when in their normal positions, the segment of a circle concentric with the segmental notched flange 4.

As above explained, the ends of the key-levers are made with cam end faces, and these cam-faces are so made that the various key-levers of each group will cause the levers 25 to be moved a different distance, so as to cause the type-wheel to revolve a sufficient extent to bring a particular letter to writing position. In order to keep the cam ends of the key-levers constantly oiled, I provide the arms or levers 25 with oil-carriers, which may be conveniently made by attaching felt or other absorbent material $25^a$ to said arms or levers. As the type-carrier is turned in one direction by the operation of one group of keys and in the reverse direction by the operation of the other group of keys, it is apparent that each key-lever of one group is adapted to move its coöperating lever 25 a different distance and that the key-levers of the other group at the other side of the machine have their cam ends similarly arranged to move the coöperating lever 25 different distances according to the key being operated and the consequent amount of rotation of the type-wheel necessary to bring the proper letter into writing position.

From the construction and arrangement of parts above described it will be seen that when a key of one group is depressed the cam end of the key-lever will engage one of the levers 25 and force it forwardly, thus turning the shaft 20 to which it is connected and causing one of the arms 21 to move in a small arc of a circle, whereby to transmit motion to the pinion 13 through the medium of the small rack-bar 22, carried by said arm or lever 21. The pinion 13 being thus turned, motion will be transmitted to the elongated pinion 15 of the type-wheel, thus turning the latter to bring the desired type into writing position. When the type-wheel pinion 15 is thus rotated, motion will be imparted by it to the flier to cause the latter to turn in a direction opposite to that of the type-wheel until the arm of said flier engages the key-lever which has been operated, and by said key-lever the movement of the flier will be arrested, thus stopping the mechanism which operated the type-wheel and bringing the latter to rest with the proper letter in position for writing. I prefer to make the arms or levers 25 quite light, and in order to prevent undue upward movement of said arms or levers the finger 24$^a$ of the flier-arm 24 is made to project over said levers 25 and over the ends of the key-levers. The finger 24$^a$ may, however, be omitted and the flier-arm made to travel near the ends of the key-levers. When a key-lever is operated as above explained, motion will be positively transmitted by one of the small rack-bars 22 to the pinion 13; but as both rack-bars are constantly in mesh with said pinion the other rack-bar will receive motion from the pinion 13, and thus the other arm or lever 21 will be moved and cause the arm or lever 25 carried thereby to move over the forward ends of the key-levers of one set, there being ample space within the notched flange 4 to permit such movement of said arm or lever 25. Both rack-bars 22 are constantly in mesh with the pinion 13 regardless of what key is operated and neither is ever disengaged from said pinion to permit the operation of a key-lever of one group or the other. This positive and continuous connection of both sets of type-wheel-operating devices with the type-wheel is a matter of importance and is permitted by the construction allowing the outward movement of the levers 25 over the ends of some of the key-levers and by mounting the flier loosely and independently of the pinion 13. By such construction I am enabled to dispense entirely with the employment of an independent lock commonly used on machines of the class to which my invention relates, which locks have caused more or less annoyance on account of becoming worn and failing to hold the type-wheel rigid when set in position for writing. It is apparent from the construction and arrangement of the mechanism above described that when a key is depressed the rack-bars meshing with the pinion will move in reverse directions and that when their movements are arrested by the engagement of the flier with the key which has been operated any further pressure which may be exerted on the key-lever will tend to cause the teeth of the respective rack-bars to impinge against the teeth of the pinion 13, but in view of the fact that said pinion cannot now rotate the gearing becomes wedged within itself and thus prevents any possibility of movement of the type-wheel in either direction until the key-lever shall have been released by the operator.

The key-levers should be so mounted as to reduce play and movement of their trunnions in a direction parallel with the length of the key-levers to a minimum; otherwise the mechanism might at times be imperfectly operated and the type-wheel be rotated too far or not far enough to bring the desired letter to proper writing position, and thus result in bad alinement of the writing. By the manner of mounting the key-levers as above described these defects can be readily remedied by merely removing the key-lever (which can be readily accomplished when mounted as above described) and replacing the fulcrums or trunnions with slightly larger ones. The new trunnions might be only an almost infinitesimal degree larger (such as one one-hundredth part of an inch) than those removed, but this would in some cases be sufficient to prevent play which may have occurred with the use of the old trunnions. Vertical displacement of the key ends of the key-levers will be prevented by a flange 26 on the sheet-metal cover 27 of the machine, said cover being also made with depending ears or flanges 28$^a$, which serve to prevent the entrance of dust to the bearings of the key-lever trunnions.

It will be observed that the key-levers project forwardly beyond the notched flange 4 and that the free or cam ends of said key-levers are spaced apart somewhat. This is quite an advantageous arrangement in that it allows the forward or cam ends of the levers to be bent laterally slightly in one direction or the other for the purpose of effecting or correcting the alinement of writing. It is apparent that if the cam end of a key-lever be bent laterally in either direction the operation of said key-lever will result in a slightly greater or less movement of the coöperating arm 25, and thus so regulate the movement of the gearing and the type-wheel as to insure the accurate setting of the type-wheel for the desired letter. In order to further provide for correcting alinement and compensation for wear, the tongues $8^a$ on the key-levers are provided. Should the end of the flier-arm (which strikes the side of the key-lever whereby to stop the rotation of the type-wheel at the proper time) become worn and thus fail to arrest the movement of the type-wheel at the proper point, it is apparent that the alinement of the writing will be affected. Such wear can be readily taken up and the alinement corrected by bending the tongue $8^a$ of the key-lever slightly laterally.

Each vertical shaft 20 is extended somewhat below the respective tubular uprights 19, and to the lower end of each shaft an arm or lever 28 is rigidly secured, each of said arms or levers 28 being provided with a cone 29, having bearings or balls in conical recesses in the lower ends of the respective posts or uprights 19. The arms or levers 28, pivotally connected with the frame of the machine by means of the shaft 20, project diagonally in reverse directions, so that their free ends terminate approximately at a common point centrally under the frame of the machine and normally bear or rest against a shoulder 30 on a beveled arm or block 31, which projects from a bar 32. Thus the type-wheel-actuating devices will be normally locked. The bar 32 is secured to the cross-bar of a universal frame 33. This frame comprises diagonally-disposed arms 34 and an intermediate cross-bar 35, to which latter the bar 32 is secured or made a part. The rear ends of the arms 34 of frame 33 are pivotally connected between arms 36, rigidly secured to the bottom of the frame A, said arms 36 being made of a length sufficient to extend somewhat beyond the rear end of the part 2 of the frame for a purpose hereinafter explained. The forward ends of the arms of the frame 33 have connected to them the depending arms 37 of a universal bar 38, disposed over the key-levers, preferably just inwardly of the segmental flange 4 of the frame and over the adjustable teeth $8^b$. By bending these teeth upwardly wear between the key-levers and universal bar can be compensated for. To prevent noise, which might be occasioned by the engagement of the key-levers with the universal bar, I cover the latter with soft material, such as rubber tubing $38^a$. The rear extremities of the arms of the frame 33 are made with lugs or projections 39, normally disposed over the inclined inner ends 40 of a U-shaped frame 41, disposed between the arms 36 and pivotally connected thereto at points in rear of the forward inclined ends 40. To the cross-bar of the U-shaped frame 41 a sheet-steel spring 42 is secured for the purpose of applying force to the hammer 43. The hammer-arm 44 is bent or curved so as to mark an angle somewhat less than a right angle and at its lower end is made with an integral yoke 45, which projects from said hammer-arm at an angle preferably slightly greater than a right angle. Against the under face of the stem 46 of the yoke 45 the spring 42 is adapted to press in a manner presently explained. The yoke is so pivotally connected with the machine that the pivotal support of the hammer, of which it forms a part, will be directly under and in line with the point of writing, whereby the maximum force of the hammer with respect to the type-wheel will be exerted at the point of writing—viz., at the instant the impression is made on the paper. The lower end of the hammer-arm is made with a tooth 47, with which a hook 48 of a tripping-lever 49 engages. The tripping-lever 49 is pivotally supported between the free ends of the rigid arms 36, and comprises an arm $49^a$, having the hook 48 at its free end, and a U-shaped yoke 50, the arms of which are disposed parallel with the arms 36 and beveled at their free ends to normally rest (by their own weight) on the U-shaped frame 41.

From this construction and arrangement of parts it will be seen that when any key-lever of either group above described is depressed the type-wheel-actuating mechanism will be moved, as above described, and the type-wheel set for the letter corresponding to said key-lever, and simultaneously the universal bar 38 will be raised, thus raising the pivoted frame 33 and moving the shoulder 30 on arm 31 out of line with the free ends of arms or levers 28, so as to permit the operation of the type-wheel-actuating mechanism. The operation of the gearing will cause the shafts 20 to turn in opposite directions, and consequently the arms or levers 28 will be moved in reverse directions. Now when the key-lever which has been depressed is released the pivoted frame 33, which constitutes a weight, will be permitted to descend, whereupon the beveled arm 31 (being forced down by the weight of frame 33) will press against one of the arms or levers 28 and move it to its normal position. The other arm or lever 28 will be positively returned to its normal position by means of a bent pin or arm $33^a$, secured to the weight or universal frame 33, one of such bent pins or arms being provided for each arm or lever 28. Motion will thus be imparted to one of the rack-bars of the gearing through the intermediate connections, and the return of the type-wheel and the arm or lever 25 which had been actuated to their normal positions will be effected. The other rack-bar will at the same time be actuated by the pinion 13, and the other lever 25 and the other arm or lever 28 will thus be returned to their normal positions. Thus it will be seen that when the frame 33 descends and the beveled arm 31 engages one of the levers 28 the latter will be moved so as to turn the shaft 20 to which it is secured. The shaft 20 being thus turned, motion will be transmitted by one of the rack-bars to the type-wheel pinion, and by the latter motion will be transmitted to the other rack-bar, whereby the other shaft 20 will be turned and the other lever 28 be brought to its normal position, this return of the last-mentioned lever 28 being assisted positively by one of the pins 33ª on the pivoted frame, as above explained.

When a key-lever is depressed and the pivoted frame 33 raised, as above described, the engagement of the lugs or projections 39 at the pivoted end thereof with the arms of the U-shaped frame 41 will cause the latter to turn on its fulcrum and compress the spring 42 against the base portion of the hammer-arm. At the same time the movement of the frame 41 by its engagement with the arms of the trip-lever will cause the latter to be turned on its fulcrum and commence to move the hook 48 off of the tooth 47 of the hammer-arm. Before the tripping-lever shall have released the hammer-arm, however, the key-lever has been moved to a sufficient extent to cause its cam or inclined end to have moved its full length over the coöperating lever 25. When the key-lever has reached this position, the flier will have engaged it and the type-wheel will have been set for the desired letter. As the flier is now in engagement with the key-lever, the further upward movement of the cam end of the latter cannot affect the position of the type-wheel. The key-levers are therefore beveled, as at 9, so as to permit a slight further movement of the key-levers than is necessary to properly set the type-wheel. During the upward movement of the universal bar 38 and frame 33 caused by the depression of a key-lever for the purpose of "setting" the type-wheel the U-shaped frame has turned on its fulcrum and compressed the spring 42 against the base of the hammer-arm, as above explained. While the U-shaped frame 41 is thus turning its engagement with the beveled arm of the trip-lever will cause said lever to be turned on its fulcrum and the under face of the hook 48 to ride over the face of the tooth 47 of the hammer-arm. The key-lever being now further depressed, (as will be permitted by the inclined or beveled portion 9 at the cam end thereof,) the U-shaped frame 41 will be turned farther and result in moving the trip-lever sufficiently to cause the hook 48 to move off of the tooth 47 of the hammer-arm, and thus release the hammer, when the spring 42 will expend its stored energy to force the head 51 of the hammer (which head is preferably made removable) toward the paper, inking-ribbon, and type-wheel and cause the impression of a letter to appear on the paper. Thus it will be seen that during the operation of a key-lever the type-wheel will be first set for the letter or character corresponding to the key which has been depressed, and after the type-wheel shall have been thus set the hammer will be released to effect the printing or writing. In order to prevent any possibility of the hammer bearing against the paper after the impression has been made and before the key shall have been released by the operator, I provide a hook 45ª, attached at its upper end to the yoke 45 of the hammer-arm and adapted to project under an arm of the U-shaped frame 41, so that when the hammer shall have performed its function of causing the impression to be made on the paper it will be immediately withdrawn by the weight of the U-shaped frame 41.

The letters and characters are arranged on the type-wheel in three rows, as usual in machines of this class, the small letters and some characters for punctuation being arranged in the top row, the capital letters and other punctuating characters in the next row, and the figures in the next row. It is therefore necessary to move the type-wheel and the elongated pinion which operates it upwardly either temporarily to permit the writing of a single letter or character or permanently when it is desired to write several letters or words in capitals or a number of figures. To permit these results, the devices now to be described will be employed. Two grooved guides 52 52 are secured to the intermediate portion of the main frame at each side of the elongated pinion 15 and project both above and below the web of the frame. Through these guides two arms 53, projecting from a plate or bar 54, pass freely, said arms being secured to the laterally-projectings ends of a plate 55, disposed between the upper end of the elongated pinion 15 and the annular flange 17ª on the tubular shaft 16. The plate or bar 54 projects laterally in both directions from the arms 53 and at its respective ends is made with U-shaped or slotted arms 56 56ª, one or both of which may be permitted to engage a block or stop 57ª on the main frame, whereby to limit the upward movement of the plate or bar 54. To one side of the main frame two key-levers 57 58 are pivotally supported between their ends on a single pivot-pin 59, one of said key-levers being provided with a key or button 60, representing capitals, and the other key-lever being provided with a key or button 61, representing figures. The key-levers 57 58 are maintained in and returned to their normal positions by means of springs 62, said springs being bent between their ends around the pivot-pin 59, and the ends of said springs are secured, respectively, to said levers and to the frame of the machine. Both key-levers 57 58 are adapted to play in the U-shaped or slotted arm 56; but they will be limited in their movement by fingers 63 64, which are adapted to engage the under face of the frame when the key-levers 57 58 are depressed, the finger 63 on the key-lever 57 being shorter than the finger 64 on the lever 58, whereby the lever 57 will be permitted to have a further movement than the lever 58. From this construction and arrangement of parts it will be seen that when one or the other key-lever 57 58 is depressed the forward end thereof will engage the end wall of the slotted or U-shaped arm 56, and thus move the plate or bar 54 upwardly and result in raising the type-wheel for a letter or character of the lower or intermediate row on the type-wheel, according to the key-lever 57 or 58 which has been pressed. When the key-lever 57 or 58 shall have been released by the operation, it will be returned to its normal position by means of the spring, as above explained, and the type-wheel, elongated pinion, and plate or bar 54, with its several arms, will drop to the normal positions by their own gravity. It frequently happens, as above intimated, that it is desirable to set the type-wheel permanently or for a considerable time, as when one or more words are to be written with capital letters or it is desired to write a number of figures. For this reason two additional key-levers 65 66 are pivoted to the main frame at the opposite side thereof from the key-levers 57 58 and are in all respects duplicates of the latter. The forward ends of the key-levers 65 66 play within the slotted or U-shaped arm 56ª and coöperate with the same to effect the setting of the type-wheel in precisely the same manner as above described in connection with the key-levers 57 and 58. A small transverse shaft 67 is mounted in suitable bearings on the arms 36. Both ends of this shaft extend beyond its bearings, and to one end an arm 68, having two teeth 69 70, is secured and adapted to be engaged by a pin 71 on the slotted arm 56ª of the plate or bar 54. To the other end of the shaft 67 an arm 72 is secured and is made to normally bear against the outer face of the upper end of the slotted or U-shaped arm 56 by means of a spring 73, one end of which is attached to the arm 72 and the other end to one of the rigid arms 36. Now when one of the key-levers 65 or 66 is depressed the bar 54, elongated pinion 15, and the type-wheel will be raised in the manner as above explained, but the pin 71 will engage one or the other of the teeth 69 70 of arm 68, and the parts, including the type-wheel, will thus be retained in an elevated position after the key-lever shall have been released, so as to permit continued use of capitals or figures, as the case may be. It will be readily seen, however, that when one of the key-levers 57 58 is depressed the free end thereof will engage the arm 72 and cause the shaft 67 to be turned sufficiently to move the toothed arm 68 out of the path of the pin 71 on the slotted or U-shaped arm 56ª. For this reason the type-wheel will not be retained elevated when either lever 57 58 is depressed; but as the arm 72 is omitted from the end of the shaft adjacent to the ends of the key-levers 65 66 the shaft will not be turned by the operation of either lever 65 or 66, and consequently the locking-arm 68 will be free to act to retain the type-wheel elevated in the position to which it may be elevated by one of said key-levers 65 66. It is apparent that the type-wheel can be released from its elevated position by a depression of either key-lever 57 or 58, the end of the lever which has been depressed engaging the arm 72 and turning the shaft 67, so as to move the toothed locking-arm 68 away from the pin 71 on arm 56ª, and thus release the bar 54 and permit the return of the type-wheel to its normal position.

The rear portion 2 of the main frame is recessed for the reception of the carriage C. The carriage comprises a lower sliding part 74 and an upper part 75, hinged at its rear edge to the rear edge of said lower part 74. The sliding part 74 of the carriage is made in its longitudinal edges with comparatively wide grooves 76, and to the part 2 of the frame guide-plates 77 are secured in such manner that their inner longitudinal edges will project somewhat over the recess in which the lower part of the carriage moves. Each plate is provided at its ends and also at a central position with inwardly-projecting pins 78, which constitute bearings for antifriction-collars 79, which run in the grooves 76 of the sliding part of the carriage. Between the end plates 80 81 of the hinged part 75 a paper-carrying roller 82 is mounted in elongated bearings, and with this paper-carrying roller a single rubber-covered feed-roller 83 coöperates to effect the proper feeding of the paper. The roller 82 is intended to receive and have wound thereon the paper on which the writing is to be done; but it acts also, as above intimated, in coöperation with the roller 83 to feed the paper. The roller 82 is normally forced toward the roller 83 by means of springs 84. A rod or bar 85 is disposed behind the roller 82 and mounted in elongated slots in the end plates 80 81. To this rod or bar a number of spring-fingers are secured and embrace the paper-carrying roller. These fingers may consist of two sets 86 87 of long fingers and two sets 88 89 of shorter fingers, the latter alternating with the longer fingers, and all of said fingers may be stamped from a single piece of sheet-brass or other suitable metal. The fingers 86 terminate above and in close proximity to the feed-roller 83, and the free ends of the fingers 87 are flared, bent slightly outward, as at $x$, and terminate under and in close proximity to said feed-roller.

It will be seen that when the edge of a sheet of paper is inserted between the rollers 82 and 83 and the roller 82 turned the frictional contact of said rollers against the paper will cause the latter to pass between the rollers. As soon as the edge of the paper has thus passed between the rollers it will be met by the flaring ends $x$ of the fingers 87 and by said fingers and the short fingers 88 will be guided around the paper-carrying roller 82. As the roller 82 continues to be turned the paper will be guided and be made to wind on said roller by the fingers 86 and 89. The paper-carrying roller may be conveniently turned by means of a knob 90, secured to one of the journals of said roller. A star-wheel 91 is secured to the journal of feed-roller 83 and is adapted to be engaged by a tooth 92 on an arm or lever 93, pivoted to the end plate 80, and said tooth is maintained normally in engagement with the star-wheel by means of a spring 94, thus preventing the rollers from accidentally turning. The pivoted arm or lever 93 is provided with a handle 95, by means of which said lever can be moved away from the star-wheel when it is desired to freely rotate the paper-carrying roller. When the lever 93 is thus moved away from the star-wheel, a pin 96 will be engaged by the hooked end of a weighted lever 97. By pressing on the weighted end 98 of said lever 97 the lever 93 will be released and permitted to again engage the star-wheel.

For the purpose of effecting the feed of the paper line by line the devices now to be described will be employed. An angular lever 99 is pivotally attached to the end plate 81 of the carriage and provided at the extremity of its upper arm with a thumb-piece 100. The lower arm 101 of the lever 99 is enlarged and provided with a slightly-curved elongated slot 102, through which a journal of the feed-roller 83 passes. A ratchet-wheel 103 is secured to the journal of the feed-roller and is adapted to be actuated by a small ratchet-bar 104, pivotally connected at one end to the enlarged portion of the angular lever 99 and prevented from accidental escape from the ratchet-wheel by means of a spring $104^a$. The maximum movement of the lever 99 for effecting a movement of the feed-roller sufficiently to move the paper for a double space is limited by the elongated slot 102. Movement of the lever 99 is effected by pressure upon the thumb-piece 100 and in the other direction by means of a spring 105.

In order to adjust the lever 99, whereby to turn the feed-roller for a single line, it is simply necessary to place an obstruction in the elongated slot 102, so as to restrict the throw of said lever 99. This can be readily accomplished by means of a small pivoted block 106, having a knob 107, said block being limited in one direction by means of a pin 108 and in the other direction by means of a pin 109.

It is desirable to provide a "margin" stop for the carriage, so that the lines of writing may begin at any desirable distance from the edge of the paper, and for this reason the rod 110, which serves to hinge the upper part of the carriage to the lower part thereof, is mounted loosely and extended at one end beyond its bearing for the reception of an arm 111, from which a pin 112 projects and normally rests on the lower part of the carriage. The pin 112 will be held normally down in contact with the lower part of the carriage by means of a spring 113, coiled on the rod 110 and secured at its respective ends to said rod and to the carriage. When the rod 110 is in its normal position, a pin 114, intermediate of the ends of said rod, will be held out of line with a stop-arm 115, projecting from a stop-block 116. The block 116 is mounted on a rack-bar 117, projecting from one of the guide-plates 77, and said block is provided internally with ratchet-teeth 118 to engage the teeth of the ratchet-bar. The stop-block is adapted to be given a slight vertical movement on the ratchet-bar, but the teeth 118 are maintained normally in engagement with the teeth of the ratchet-bar by means of a spring 119. From this construction it will be seen that the stop-block can be readily moved on the ratchet-bar 117 and will become automatically locked in the position to which it may be moved. When the stop-block shall have been adjusted for the desired margin, the arm 111 will be raised, so as to turn the rod 110 and bring the pin 114 in line with the arm 115 on the stop-block 116, thus forming a stop to limit the return movement of the carriage and regulate the width of margin on the paper.

On the bottom of the lower or sliding part of the carriage the ratchet-bar 120 of the carriage-feed mechanism is secured, and this mechanism will now be described in detail. A lever 121 is pivotally supported intermediate of its ends between the rigid arms or bars 36, and the inwardly-projecting arm 122 of this lever is disposed over the cross-bar 35 of the pivoted frame 33, so as to be moved upwardly when said frame is moved upwardly, said lever 121 being moved in the other direction by means of a spring 123. The forwardly-projecting arm 124 of lever 121 is made with a head or enlargement 125, having teeth 126 to engage the ratchet-bar 120, said toothed head thus constituting the rigid dog of the ratchet feed mechanism. The pivoted dog 127 of said ratchet feed mechanism is carried by the head or enlargement 125, said pivoted dog being pressed in one direction by a spring 128 (preferably of hard rubber) and limited in the other direction by a pin 129 on the head or enlargement 125. In order to provide means whereby to adjust the dogs of the carriage-feed ratchet devices with respect to the ratchet-bar, and thus control the accurate operation of said ratchet devices, I make the screw $a^2$, which passes through the center of the inner guide-plate 77, of sufficient length to engage the head or enlargement 125 and form an abutment therefor. By means of this screw the extent of upward movement of the dogs 126 and 127 can be adjusted and controlled. It will be seen that when any one of the key-levers 5 is depressed the universal bar 38 and the pivoted frame 33 will be raised in the manner hereinbefore explained, and the engagement of the cross-bar of said pivoted frame 33 with the pivoted lever 121 will cause said lever to turn on its fulcrum, so as to move the rigid dog 126 into engagement with the ratchet-bar 120 and permit the pivoted dog 127 to move in line with the next tooth of the ratchet-bar. Should the key-lever be now released, the parts would assume their normal positions, so as to release the lever 121, whereupon the latter would be returned to its normal position by means of the spring 123, the rigid dogs 126 moved out of engagement with the ratchet-bar, and the pivoted dog moved into engagement with the ratchet-bar, thus effecting the feeding of the carriage.

A spacing key-lever 130, having a large key 131, is mounted in the center of the frame and near its forward end is notched, as at 132, for the reception of the universal bar 38. To the free forward end of the key-lever 130 one end of a rod or wire 133 is attached, and the other end of this rod or wire is attached to the pivoted lever 121 of the ratchet feed mechanism. It is apparent from the foregoing that the manipulation of the key-lever 131 will effect the feed of the carriage for spacing between words. It will also be observed that the operation of the spacing key-lever will not affect the mechanism which controls the type-wheel and that as said lever is provided with the notch 132 the universal bar 38 will not be raised when the lever 130 is depressed, and thus the feeding of the carriage can be effected without also operating the hammer mechanism. It is desirable to move the dogs entirely free of the ratchet-bar when the carriage is to be brought forward to a desired point. For this purpose I provide a key-lever 134, pivotally supported under the frame A and guided in its movements by a guide 135, secured to the frame, the inner end of said key-lever being curved and provided with a key or button 136, disposed under the main spacing-key 131. The forward end of the releasing-key lever 134 is adapted to engage the inner end of the pivoted lever 121 and when the key-lever 134 is depressed to move it sufficiently to entirely disengage the dogs from the ratchet-bar, and thus release the carriage. The key-lever 134 is maintained in and returned to its normal position by means of a spring 134$^a$.

The carriage is fed in one direction by means of a spring-actuated drum 137, mounted on a stud projecting from the part 2 of the frame, and to the free end of said stud a bell 138 is secured. A strap 139 is attached at one end to and wound on the drum 137 and at its other end is secured to the carriage. An arm 140 is pivoted to the part 2 of the frame, and to this arm the arm of the hammer 141 for the bell 138 is secured, the hammer being normally pulled toward the bell by means of a spring 142. A dog 143 is pivotally attached to the arm 140 and is prevented from turning in one direction by means of a pin 144 on the arm 140, so that when a pin 145 on the carriage engages said dog the arm 140 will be turned on its pivotal support until the pin 145 passes the dog 143, at which time the arm will be pulled back to its normal position by the spring 142 and the hammer thus made to strike the bell to indicate approach of the extent of movement of the carriage. The dog 143 will be permitted free movement in the reverse direction to allow the return of the carriage, but will be returned to and maintained in its normal position by means of a sheet-metal spring 146, secured at one end to the arm 140 and bearing at its other end with a sliding contact against said dog.

It now remains to describe the construction and operation of the mechanism for controlling the feed of the inking-ribbon 147. The vertical shafts 20, with which the type-wheel-operating mechanism is connected, as above explained, are extended some distance above their bearings on the tubular uprights 19 and serve as journals on which sleeves or short tubular shafts 148 are loosely mounted. Thin disks are secured to the lower ends of the sleeves or shafts 148, each disk having fine teeth in its periphery, whereby to form ratchet-wheels 149. With the ratchet-wheels dogs 150 are adapted to engage, and these are pivotally connected to the part composing the arms or levers 21 and 25, so that when said arms or levers are moved motion will be transmitted by one or the other of said dogs to the coöperating ratchet-wheels. The dogs 150 are provided with pins 151, which project upwardly alongside arm 152 at the respective ends of a bar 153, loosely mounted in its center on the central post 12. The arms 152 of bar 153 are provided with lugs 154, normally disposed over the ratchet-wheels 149 and acting to prevent vertical displacement of the same. The lugs 154 also bear against the dogs 150 and serve, when the bar 153 is turned on its fulcrum, to move one of said dogs into engagement with its respective ratchet-wheel 149 and permit the other dog to move out of contact with the ratchet-wheel with which it is intended to coöperate. If desired, however, the dogs may be moved away from their ratchet-wheels by engagement of the inner edge of the arms 152 of bar 153 therewith. The pins 151 on the dogs 150 are adapted to move in the spaces between the arms 152 of the bar 153 and spring-arms 155, secured to said bar and disposed practically parallel with the arms 152. These spring-arms each serve a double purpose—viz., to move one of the dogs into engagement with its coöperating ratchet-wheel when the other dog is moved away from the other ratchet-wheel and also to act as a spring to maintain the dog in engagement with its ratchet-wheel and at the same time permit it to ride over the teeth of the ratchet-wheel, so as to take a new bite thereon. Retrograde motion of the ratchet-wheel being positively rotated by the devices above described will be prevented by means of a spring-dog 156, one of such dogs being secured to the end of each arm 152 or to the lugs 154 thereon. The bar 153 is provided centrally between its ends with a spring-arm 157, having a pin 158 at or near its free end, said pin being provided with a knob or button 158$^a$. The pin 158 is adapted to project through a hole 159 in the cover 27 of the machine, and projecting into this hole is a tooth 160, against one side or the other of which the pin 158 is adapted to rest, and thus maintain the bar 153 in the position to which it may be moved. The shafts 20 and the sleeves or tubular shafts 148 also project up through holes in the cover 27 for the accommodation of reels 161 162, on which the inking-ribbon 147 is wound. The reels are made with openings $x'$, through which the operator can readily see the quantity of ribbon on said reels. The wall of the opening through each reel is made with a groove for the reception of a spline 162$^a$ on the respective sleeves or tubular shafts 148, whereby to cause reels to turn therewith. The splines 162$^a$ will preferably be made of spring metal and will be secured at one end only, so that they will serve to prevent the accidental displacement of the inking-ribbon reels. From this construction and arrangement of inking-ribbon-feeding mechanism it will be seen that when the pin 158 is at one side of the tooth 160 on the cover 27 the ratchet devices at one end of the bar 153 will be in position to engage one of the ratchet-wheels and actuate the same and the ribbon-reel connected therewith, while the ratchet devices at the other end of said bar 153 will be entirely free from the other ratchet-wheel. Consequently when one dog 150 is actuated the coöperating ratchet-wheel and ribbon-reel will be turned and the inking-ribbon will be wound on said reel and unwound from the other one. When it is desired to shift the ribbon, it is merely necessary for the operator to move the pin 158 from one side to the other of the tooth 160, whereupon the bar 153 will be turned on its fulcrum, with the result of rendering inoperative the ratchet devices at one end of said bar 153 and setting the ratchet devices at the other end thereof to operate the other ratchet-wheel and reel and cause the inking-ribbon to travel in the reverse direction and become wound upon the reel from which it has just been unwound.

Now it will be observed that the actuating power for the dogs 150 is supplied by the same mechanism which transmits motion to the type-wheel for setting it, said dogs being attached to the levers 21 25, by means of which motion is transmitted from the key-levers to the gearing which actuates the type-wheel. Thus it will be seen that the ink-ribbon-feeding devices are only operated when a key-lever is depressed, which operates to set the type-wheel, and that said ribbon-feed devices are never operated when a spacing-key is operated. The inking-ribbon will therefore be used uniformly and be fed just fast enough to present a new surface after each impression has been made.

On some machines of the class to which my invention relates a metal plate having a hole therein has been employed to prevent the soiling of the paper from the effect of the hammer. Such a metal plate would not result advantageously with my improved machine to prevent the soiling of the paper when manifold or carbon copies are being made. I therefore propose to employ a soft flexible or pliable guard 163, preferably of soft rubber, having a hole 164 for the accommodation of the hammer. The guard 163 may be conveniently made with perforated bosses or enlargements 165 at its ends, which will be placed on small posts or enlargements 166, made at the ends of a curved flange 167 on the cover 27. The cover will be secured to the frame at several points by means of screws 169. The inking-ribbon is guided through the slots 171, formed by the posts 166, and the upper ends of said posts are bent to form small projections 172, which serve to prevent the escape of the ribbon.

While the carriage C is shown and described as being made in two parts hinged together, it is not intended that the upper part shall be capable of being raised at right angles to the lower part to permit erasures to be made, but merely to permit said upper part of the carriage to be raised sufficiently to allow the operator to get a better view of the last line of writing, and in order to limit the extent which the upper part of the carriage can be raised I employ a stop 170, which is so constructed as to normally act as a lock to hold the two parts of the carriage immovably together.

While my improved type-writing machine may appear to contain a number of parts, as all machines of this class must, still in point of fact the number of parts is reduced to a minimum. The cost of production will be small as compared with other machines of this class, and the machine is effectual in all respects in the performance of its functions.

Numerous slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a type-writing machine, the combination with the key-levers, the type-carrier and intermediate gearing between the key-levers and type-carrier, of a flier arranged to receive motion from said gearing, the free end of said flier being bent upwardly and outwardly in the path of movement of the forward ends of the key-levers so as to engage the side face of the forward end of a key-lever when it is moved by the operator, substantially as set forth.

2. In a type-writing machine, the combination of a series of key-levers and a type-carrier, gearing connected with said type-carrier, actuating-levers connected with said gearing and disposed in position to be moved by said key-levers and a flier arranged to receive motion from said gearing and having its free end bent up and projecting over said actuating key-levers and in the path of movement of the forward ends of key-levers so as to engage the latter when moved by the operator, substantially as set forth.

3. In a type-writing machine, the combination with key-levers, a type-carrier and gearing for transmitting motion to said type-carrier, of two pairs of pivoted arms, the arms of each pair being integral with each other, one arm of each pair being in position to be moved by engagement of the key-levers therewith and racks carried by the other integral arm of each pair, whereby to transmit motion to said gearing, substantially as set forth.

4. In a type-writing machine, the combination with a type-carrier and gearing connnected therewith, of two pivoted levers, key-levers coöperating therewith, a pivoted universal frame coöperating with said key-levers and arms secured to said universal frame and acting to force said pivoted levers to and retain them in their normal positions, substantially as set forth.

5. In a type-writing machine the combination with a type-carrier, gearing connected therewith and key-levers, of two pairs of arms or levers coöperating with the key-levers and gearing, loosely-mounted shafts to which the respective pairs of arms or levers are connected, arms secured to said shafts and a beveled device constructed and adapted to hold said last-mentioned arms in their normal position and to return them to their normal position whereby to cause the type-wheel to assume its normal position, substantially as set forth.

6. In a type-writing machine, the combination with a type-carrier, gearing connected therewith and key-levers, of two pairs of arms or levers coöperating with the key-levers and said gearing, loosely-mounted shafts to which the respective pairs of arms or levers are secured, arms secured to the lower ends of the respective shafts, and a beveled block constructed to be moved by the key-levers, said block having a shoulder against which both the arms secured to the lower ends of the shafts rest, substantially as set forth.

7. In a type-writing machine, the combination with a type-carrier, gearing connected therewith and key-levers, of two arms or levers coöperating with said key-levers and gearing, loosely-mounted shafts to which said arms or levers are secured, arms secured to the lower ends of said shafts, a pivoted frame common to and adapted to be moved by said key-levers, a beveled block carried by said pivoted frame and coöperating with said arms to return one or the other to its normal position and inclined pins secured to said pivoted frame and adapted to return the arm not returned by said beveled block, substantially as set forth.

8. In a type-writing machine, the combination with a type-carrier, gearing connected therewith, key-levers and levers coöperating with said gearing and key-levers, of loosely-mounted shafts to which said levers are secured, arms secured to the lower ends of said shafts, a pivoted weight engaged by said arms, and means carried by said weight constructed and adapted to return said arms and parts with which they are connected, substantially as set forth.

9. In a type-writing machine, the combination with a type-carrier, gearing connected therewith and key-levers, of two arms or levers coöperating with said key-levers and said gearing, loosely-mounted shafts to which said arms or levers are secured, arms secured to the lower ends of said shafts, a pivoted frame common to and adapted to be moved by said key-levers, and a beveled block or arm carried by said pivoted frame and coöperating with the arms secured to the lower ends of said shafts, whereby to effect the return of the type-wheel and coöperating parts to their normal positions, substantially as set forth.

10. In a type-writing machine, the combination with a type-carrier, gearing connected therewith and key-levers, of two arms or levers coöperating with said key-levers and gearing, loosely-mounted shafts to which said arms or levers are connected, arms secured to the lower ends of said shafts, a pivoted frame, a beveled arm or block carried by said frame and adapted to effect a movement of the arms on the lower ends of the shafts whereby to return the type-carrier and coöpating parts to their normal positions and a universal bar disposed over the key-levers and connected with said pivoted frame, substantially as set forth.

11. In a type-writing machine, the combination with a type-carrier, of key-levers, arms or levers coöperating with said key-levers, intermediate devices between said type-carrier and arms or levers and lubricators for supplying lubricant between said arms or levers and the key-levers, substantially as set forth.

12. In a type-writing machine, the combination with a type-carrier, gearing connected therewith, key-levers, and arms or levers coöperating with said key-levers and lubricators mounted on said arms or levers, substantially as set forth.

13. In a type-writing machine, the combination with a type-carrier, gearing connected therewith, key-levers, and arms or levers coöperating with said gearing and with the key-levers, of absorbent material carried by said arms or levers, substantially as set forth.

14. In a type-writing machine, the combination with a type-carrier, arms or levers and intermediate connections between said arms or levers and type-carrier, of key-levers to move said arms or levers, a flier to engage the key-levers and tongues on the key-levers constructed and adapted to be bent independently of the body of the key-lever, whereby to correct the alinement of the machine and compensate for wear, substantially as set forth.

15. In a type-writing machine, the combination with carriage-feed mechanism and hammer mechanism, of a series of key-levers, a pivoted frame connected with said mechanisms, a universal bar connected with said pivoted frame and common to all of said key-levers and adjustable teeth on said key-levers and adapted to engage said universal bar, whereby to raise said universal bar and pivoted frame and actuate both of said mechanisms, substantially as set forth.

16. In a type-writing machine, the combination with a series of key-levers, a type-carrier, operating mechanism for said type-carrier and a universal bar common to all of said key-levers, of a pivoted hammer, a trip device constructed to maintain said hammer normally withdrawn from the type-carrier, and a pivoted frame connected at one end with the hammer and trip device and connected at its other end with said universal bar, whereby, when a key-lever is manipulated the trip device will be operated to release the hammer and the latter propelled toward the type-carrier, substantially as set forth.

17. In a type-writing machine, the combination with a series of key-levers, of a pivoted hammer-arm, a pivoted frame, a spring secured to said frame and bearing against said hammer-arm, trip mechanism for the hammer-arm, connections between said pivoted frame and the key-levers, and a bent arm or hook secured to said hammer-arm and terminating under said pivoted frame, whereby the hammer will be promptly withdrawn by said pivoted frame, after an impression shall have been made and before the key-lever shall have been released, substantially as set forth.

18. In a type-writing machine, the combination with a frame having tubular posts, a type-carrier, gearing connected therewith and key-levers, of arms or levers coöperating with said key-levers and gearing, shafts passing loosely through said tubular posts and having said arms or levers secured to them, cones on said arms or levers and having bearings in recesses in the upper ends of said posts, arms secured to the lower ends of the shafts, cones on said last-mentioned arms having bearings in recesses in the lower ends of said posts, and means for operating said last-mentioned arms whereby to effect the return of the type-wheel and coöperating parts, substantially as set forth.

19. In a type-writing machine, the combination with a series of key-levers, a type-carrier, a hammer, a carriage and carriage-feed mechanism, of a pivoted lever forming part of said feed mechanism, a universal bar common to all of said key-levers, and a pivoted frame connected with the universal bar and arranged to actuate the hammer and the lever of the carriage-feed mechanism, substantially as set forth.

20. In a type-writing machine, the combination with a type-carrier, key-levers, operating devices intermediate of the key-levers and type-wheel and hammer-operating mechanism, of carriage-feeding devices, a universal bar common to said key-levers and connected with the hammer-operating mechanism, and a spacing key-lever connected with said carriage-feed mechanism, said spacing key-lever being so disposed as not to operate the type-carrier mechanism and being slotted so as not to engage the universal bar, whereby spacing between words can be accomplished without operating any part of the writing mechanism, substantially as set forth.

21. In a type-writing machine, the combination with a series of key-levers, a carriage and a ratchet-bar secured to said carriage, of a pivoted lever having a fixed dog at one end, a spring-pressed dog pivoted to said lever and coöperating with the fixed dog and the rack to effect the feeding of the carriage, a pivoted device under said lever and a universal bar common to said key-levers and connected with said pivoted device, whereby to effect spacing between letters when the key-levers are operated, substantially as set forth.

22. In a type-writing machine, the combination with the key-levers and a carriage having a ratchet-bar, of a pivoted lever having a fixed dog at one end, a spring-pressed dog pivoted to said lever and coöperating with the fixed dog and ratchet-bar, connections between the other end of said lever and the key-levers, whereby to move said lever in one direction, a spring for moving said lever in the other direction and a set-screw passing through the frame of the machine whereby to effect the adjustment of the vertical movement of the end of said lever at which the dogs are located, substantially as set forth.

23. In a type-writing machine, the combination with the frame, the carriage and a ratchet-bar on the carriage, of a lever pivotally supported between its ends by said frame, a fixed dog at one end of said lever, a spring-pressed dog pivotally attached to said lever and coöperating with the fixed dog and the ratchet-bar, a spring tending to force the inner end of said lever downwardly and a key-lever pivotally supported between its ends by the frame whereby to press said inner end of the first-mentioned lever upwardly and depress the outward or forward end thereof to move both dogs out of engagement with the ratchet-bar and thus entirely release the carriage, substantially as set forth.

24. In a type-writing machine, the combination with the key-levers and a hammer, of a pivoted frame, a universal bar common to said key-levers and connected with said pivoted frame, a U-shaped frame having its arms pivotally supported near their free ends and adapted to be moved by said first-mentioned pivoted frame, a spring secured to said U-shaped frame and bearing against the arm of the hammer, substantially as set forth.

25. In a type-writing machine, the combination with the frame of the machine, the key-levers and a hammer, of a pivoted frame, a universal bar common to said key-levers and attached to said pivoted frame, a U-shaped frame pivoted near the free ends of its arms and adapted to be actuated by said pivoted frame, a spring secured to the U-shaped frame and bearing against the arm of the hammer, and a tripping-lever constructed to engage said hammer-arm and to be actuated by said U-shaped frame, substantially as set forth.

26. In a type-writing machine, the combination with the frame of the machine, and the key-levers, of a hammer having a pivotal support under the frame, a pivoted lever or frame, a spring secured thereto and bearing against the hammer-arm, a tooth on the hammer-arm, a tripping-lever having a hook-arm to engage said tooth and also having arms to be engaged by said pivoted lever or frame, and connections between said pivoted lever or frame and the key-levers, substantially as set forth.

27. In a type-writing machine, the combination with a frame and rigid arms secured to the under face thereof, of a hammer-arm pivoted between said rigid arms, a U-shaped frame also pivoted between said rigid arms and having its cross-bar disposed under the hammer-arm, a spring secured to said cross-bar and bearing against the hammer, a trip-lever also pivoted between said fixed arms and adapted to engage the hammer-arm and to be engaged by the U-shaped frame, another pivoted frame terminating under the key-levers and adapted to actuate the U-shaped frame and a universal bar common to said key-levers and connected with the pivoted frame under the same, substantially as set forth.

28. In a type-writing machine, the combination with a type-carrier having several rows of type thereon and key mechanism for oscillating the type-carrier to position the same for printing, of two key-levers, each arranged to shift the type-carrier longitudinally and a locking device coöperating with one of said key-levers to hold the type-carrier in a shifted position and with the other key-lever to release said type-carrier, substantially as set forth.

29. In a type-writing machine, the combination with the frame and the type-carrier support, of two key-levers for raising said type-carrier support different distances and permit its immediate return and two other key-levers for raising the type-carrier support different distances, intermediate connections between said key-levers and type-carrier support and common to them all, and locking devices coöperating with the last-mentioned pair of key-levers to retain the type-carrier and its support in raised position and coöperating with the first-mentioned pair of key-levers to release the type-carrier support and permit the type-carrier to drop to normal position, substantially as set forth.

30. In a type-writing machine, the combination with a type-carrier having two or more rows of type and mounted to be shifted longitudinally and key mechanism for turning said type-carrier axially to position it for printing, of two independent keys forming part of the bank of keys, intermediate connections between said independent keys and the type-carrier and common to both of said keys whereby the operation of either of said independent keys will shift the type-carrier longitudinally and a locking device coöperating with said intermediate connections whereby to automatically retain the type-carrier in its shifted position when one of said independent keys is operated, said locking device coöperating with one of said independent keys but not with the other to manipulate the locking device to release the type-carrier and permit it to assume its normal position, substantially as set forth.

31. In a type-writing machine, the combination with the frame and a type-carrier support, of two pairs of key-levers, one pair being adapted to raise the type-carrier temporarily and the other pair being adapted to cause the type-carrier to be raised and so remain, and devices coöperating with said key-levers and type-carrier support in such manner that the operation of one of the key-levers of the first pair will result in releasing the type-carrier support and permit the type-carrier to drop to its normal position, substantially as set forth.

32. In a type-writing machine, the combination with the frame and a type-carrier support, of a horizontal bar connected with said support, a pin on said bar, a spring-actuated, toothed arm to be engaged by said pin and key-levers adapted to engage said bar and raise the same and the type-carrier, substantially as set forth.

33. In a type-writing machine, the combination with the frame and the type-carrier support, of a horizontal bar connected with said support, key-levers to engage said bar to raise it, a pin on the bar, a pivotally-supported toothed arm to be engaged by said pin when the bar is raised by the key-lever, a spring for forcing the toothed arm toward said bar, and means for moving said toothed arm to release the bar and permit the type-carrier to drop to its normal position, substantially as set forth.

34. In a type-writing machine, the combination with a frame and a type-carrier support, of a bar connected with said type-carrier support, two key-levers adapted to engage each end of said bar to raise the same and the type-carrier support, one key-lever of each pair being adapted to raise said bar farther than the other, a shaft, a locking-arm on one end of said shaft adapted to engage the bar and maintain it raised when a key-lever of one pair is operated and an arm on said shaft to be engaged by the key-levers of the other pair whereby to move the locking-arm out of engagement with said bar and thus permit said bar, type-carrier support and type-carrier to drop to their normal positions, substantially as set forth.

35. In a type-writing machine, the combination with the frame, of slotted guides secured thereto and extending therethrough, guide-rods passing through said guides, a type-carrier support secured to said guide-rods, a bar secured to the lower ends of said guide-rods, key-levers adapted to engage the respective ends of said bar, means for limiting the movements of said key-levers and a locking device for said bar under control of the key-levers at one end only of said bar, substantially as set forth.

36. In a type-writing machine, the combination with the carriage, of two rollers mounted therein and coöperating to feed the paper, one of said rollers also serving to receive and carry the paper, a knob on the journal of one of said rollers, a star-wheel on the journal of the feed-roller, a pivoted lever having a tooth to engage said star-wheel and having a handle, a spring connected with said lever, a pin on said lever and a pivoted lever having a weight at one end and a hook at the other end to engage said pin, whereby to retain the toothed lever out of engagement with the star-wheel, substantially as set forth.

37. In a type-writing machine, the combination with the carriage and a paper-feed roller therein, of a lever pivoted between its ends to said carriage, a thumb-piece at one end and an enlargement at the other end of said lever, said enlargement having an elongated slot for the accommodation of the journal of the feed-roller, a ratchet-wheel on said journal, a ratchet-bar pivoted at one end to said lever and adapted to engage said ratchet-wheel, and a spring attached at its respective ends to said lever and to the carriage, substantially as set forth.

38. In a type-writing machine, the combination with the carriage and a feed-roller therein, of a lever pivoted to the carriage having a thumb-piece at one end and an elongated slot at the other end to receive the journal of the feed-roller, a ratchet-wheel on said journal, a ratchet-bar pivoted at one end to said lever and engaging the ratchet-wheel, a block pivoted to the lever and adapted to be moved so as to contract the length of the elongated slot and restrict the amount of feed of the paper at a stroke of the lever and stops for said pivoted block, substantially as set forth.

39. In a type-writing machine, the combination with the type-carrier, gearing connected therewith, key-levers and type-carrier-operating devices intermediate of the key-levers and gearing and adapted to rotate the type-carrier, of ink-ribbon reels, ratchet-wheels connected therewith, dogs connected to said intermediate type-carrier-operating devices and adapted to engage said ratchet-wheels, and means for shifting the dogs whereby to render one active and the other inactive, substantially as set forth.

40. In a type-writing machine, the combination with the type-carrier, key-levers and actuating devices intermediate of the key-levers and type-carrier said actuating devices being constructed and adapted to rotate the type-carrier, of inking-ribbon reels, ratchet-wheels connected with said reels, dogs connected with said actuating devices and means for controlling the operation of said dogs, substantially as set forth.

41. In a type-writing machine, the combination with the frame, ratchet-wheels supported thereby and ribbon-reels connected with said ratchet-wheels, of dogs constructed to actuate said ratchet-wheels alternately, a shifting-bar pivotally supported between its ends and having arms at its extremities, springs secured at one end to said bar and disposed alongside said arms and pins projecting from said dogs and disposed between said arms and springs, substantially as set forth.

42. In a type-writing machine, the combination with a frame, ratchet-wheels supported thereby and ribbon-reels connected with said ratchet-wheels, of pivoted dogs constructed and adapted to actuate said ratchet-wheels alternately, a shifting-bar for said dogs, arms at the ends of said shifting-bar adapted to overlap the peripheries of said ratchet-wheels, springs secured at one end to said bar and disposed alongside said arms, pins projecting from the dogs and disposed between said springs and arms and means for shifting said bar and retaining it in the position to which it is moved, substantially as set forth.

43. In a type-writing machine, the combination with the frame, ratchet-wheels supported thereby and ribbon-reels connected with said ratchet-wheels, of pivoted dogs constructed and adapted to actuate said ratchet-wheels, a shifting-bar having arms at its ends, springs secured at one end to said bar and disposed alongside said arms, pins projecting from said dogs and disposed between said arms and springs, spring-dogs secured to the arms of the shifting-bar and adapted to prevent retrograde movement of the ratchet-wheels and means for shifting and locking said shifting-bar, substantially as set forth.

44. In a type-writing machine, the combination with the frame, ratchet-wheels supported thereby, ribbon-reels connected with said ratchet-wheels and dogs constructed and adapted to actuate said ratchet-wheels alternately, of a shifting-bar constructed to shift said dogs, a spring-arm secured to said bar and having a pin, a cover having a hole through which said pin passes and a tooth projecting into the hole in the cover and adapted to retain the shifting-bar in the position to which it may be shifted, substantially as set forth.

45. In a type-writing machine, the combination with the frame and the key-levers, of a type-carrier support, a post on the frame, gearing on said post constructed and adapted to transmit motion to the type-carrier support, lateral posts, shafts mounted in said last-mentioned posts, levers secured to said shafts and coöperating with said gearing and key-levers, ratchet-wheels mounted loosely on said lateral shafts, ribbon-reels connected with said ratchet-wheels, dogs attached to said levers and adapted to actuate the ratchet-wheels alternately, a shifting-bar for said dogs mounted on the post which carries the gearing and means for shifting and locking said shifting-bar, substantially as set forth.

46. In a type-writing machine, the combination with a frame, a cover and a type-carrier, of a flange on said cover to embrace the type-carrier, posts at the ends of said flange whereby to form inking-ribbon guides, and lateral projections at the upper ends of said posts to prevent the escape of said inking-ribbon, substantially as set forth.

47. In a type-writing machine, the combination with a fixed post, of a type-wheel mounted to revolve and also to move vertically on said post as its guide, said type-wheel comprising two heads having holes for the free passage of said post and having a hollow interior obstructed only by said post passing through it, and a peripheral wall carrying type substantially as set forth.

48. In a type-writing machine, the combination with a fixed post having a contracted upper end, of a hollow type-wheel mounted on said post, the lower head of said type-wheel having a hole to receive the post and the upper head of said type-wheel having a similar hole to receive the contracted upper end of the post, substantially as set forth.

49. In a type-writing machine, the combination with a fixed post having a contracted upper end whereby to form a shoulder, of a hollow type-wheel having a hole in its lower head to loosely receive said post and having a smaller hole in its upper head to receive the contracted portion of the post, said upper head being adapted to normally rest on the shoulder on the spindle and means for rotating said type-wheel on the spindle, substantially as set forth.

50. In a type-writing machine, the combination with a fixed post, of a hollow type-wheel having holes in its upper and lower faces to loosely receive the post, a tubular shaft mounted on said post, below the type-wheel, a flange on said tubular shaft connected with the type-wheel, means for rotating said tubular shaft whereby to rotate the type-wheel and means for raising said tubular shaft whereby to raise the type-wheel, substantially as set forth.

51. In a type-writing machine, the combination with a type-carrier, key-levers and actuating devices between said type-carrier and key-levers, of a pivoted hammer normally disposed with its striking-head at the farthest end of its throw from the type-carrier, an arm projecting forwardly from the pivotal support of said hammer and connected with the latter so as to have a limited movement independent thereof, a universal bar common to all of said key-levers and a frame pivoted between its ends and connected at one end to said universal bar, the other end of said pivoted frame being adapted to engage the arm on the hammer and move the same a short distance before actuating the hammer, substantially as set forth.

In testimony whereof I have signed this specification in the presence of two subscribing witnesses.

RICHARD W. UHLIG.

Witnesses:
JNO. S. COMFORT,
DANIEL NASON.